United States Patent
Wimmer (10) Patent No.: US 9,683,827 B2
(45) Date of Patent: Jun. 20, 2017

(54) METHOD FOR DETERMINING THE AXIS OF THE ROTARY TABLE IN A COORDINATE MEASURING MACHINE

(71) Applicant: CARL ZEISS INDUSTRIELLE MESSTECHNIK GMBH, Oberkochen (DE)

(72) Inventor: Martin Wimmer, Steinheim (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 289 days.

(21) Appl. No.: 14/398,524

(22) PCT Filed: Apr. 30, 2013

(86) PCT No.: PCT/EP2013/059001
§ 371 (c)(1),
(2) Date: Nov. 3, 2014

(87) PCT Pub. No.: WO2013/164344
PCT Pub. Date: Nov. 7, 2013

(65) Prior Publication Data
US 2015/0052768 A1     Feb. 26, 2015

(30) Foreign Application Priority Data
May 3, 2012 (DE) .................. 10 2012 207 336

(51) Int. Cl.
G01B 5/00     (2006.01)
G01B 5/008     (2006.01)
(Continued)

(52) U.S. Cl.
CPC ........... *G01B 5/008* (2013.01); *G01B 21/042* (2013.01); *G01B 21/22* (2013.01)

(58) Field of Classification Search
CPC ........... G01B 5/00; G01C 25/00; G01C 21/22
(Continued)

(56) References Cited

U.S. PATENT DOCUMENTS 4,819,339 A * 4/1989 Kunzmann .......... G01B 21/042
33/1 N
4,958,438 A    9/1990 Hemmelgarn
(Continued)

FOREIGN PATENT DOCUMENTS

CN       1207807 A    2/1999
CN       1734232 A    2/2006
(Continued)

*Primary Examiner* — Yaritza Guadalupe-McCall
(74) *Attorney, Agent, or Firm* — Laurence A. Greenberg; Werner H. Stemer; Ralph E. Locher (57) ABSTRACT

A position of a turntable axis is repeatedly determined in the device coordinate system of a coordinate measuring device. A test body on the turntable is probed in a plurality of turntable positions in order to determine the X and Y coordinates of the turntable axis in the device coordinate system from the contact points. In addition, a first contact body reference point that is stationary relative to the X-axis and disposed next to the turntable is probed to determine its X coordinate. Similarly, a second contact body reference point that is stationary relative to the Y-axis is probed to determine its Y coordinate. These steps are repeated at one or more later points in time to repeatedly determine the X coordinate and the Y coordinate of the turntable axis from the X coordinate of the first contact-body reference point and the Y coordinate of the second contact-body reference point.

15 Claims, 5 Drawing Sheets

(51) Int. Cl.
*G01B 21/04* (2006.01)
*G01B 21/22* (2006.01)

(58) Field of Classification Search
USPC .......................................................... 33/503
See application file for complete search history.

(56) References Cited

U.S. PATENT DOCUMENTS

| | | | |
|---|---|---|---|
| 6,023,850 A | 2/2000 | Trapet | |
| 6,277,004 B1* | 8/2001 | Matsumoto | B23Q 3/18 451/11 |
| 6,327,788 B1 | 12/2001 | Seddon et al. | |
| 7,197,836 B2 | 4/2007 | Kikuti | |
| 9,459,121 B2* | 10/2016 | Hong | G01C 25/005 |
| 2001/0008047 A1* | 7/2001 | Okada | G01B 5/008 33/503 |
| 2008/0271332 A1 | 11/2008 | Jordil et al. | |
| 2011/0000277 A1 | 1/2011 | MacManus | |
| 2014/0350881 A1* | 11/2014 | Hong | G01C 25/005 702/95 |
| 2015/0052768 A1* | 2/2015 | Wimmer | G01B 21/042 33/503 |
| 2015/0345940 A1* | 12/2015 | Sagemueller | G01B 21/04 33/503 |
| 2016/0195389 A1* | 7/2016 | Sagemueller | G05B 19/401 33/503 |

FOREIGN PATENT DOCUMENTS

| | | |
|---|---|---|
| CN | 101298984 A | 11/2008 |
| DE | 3637410 A1 | 5/1988 |
| DE | 3719838 A1 | 12/1988 |
| DE | 4106168 A1 | 8/1991 |
| DE | 4325602 C1 | 9/1994 |
| DE | 10122080 A1 | 11/2002 |
| DE | 10237501 A1 | 3/2004 |
| DE | 102010006382 A1 | 8/2011 |
| DE | 102010037352 A1 | 3/2012 |
| GB | 2241338 A | 8/1991 |
| WO | 02090879 A2 | 11/2002 |
| WO | 2013068044 | 5/2013 |

\* cited by examiner

METHOD FOR DETERMINING THE AXIS OF THE ROTARY TABLE IN A COORDINATE MEASURING MACHINE

BACKGROUND OF THE INVENTION

Field of the Invention

The present invention relates to a novel method for determining the location of the axis of a rotary table in a coordinate measuring machine.

The reference point of a coordinate measuring machine (CMM) is the origin of the machine coordinate system. Here, a "machine coordinate system" is to be understood to mean the predetermined coordinate system of the CMM which is situated parallel to the displacement axes of the CMM. All measurements and derived calculations relate to the reference point. The reference point is established by means of a so-called reference point run. The reference point run is an automated measurement routine and a precondition for all measurements. A reference point run is performed at the very least after putting the CMM into operation. The reference point measurement must be repeated at later times because the reference point drifts as a result of temperature influences and other influences.

If a rotary table is used in a CMM, the location of the axis of rotation of the rotary table (also referred to as rotary table axis or RT axis [RT=rotary table]) must be re-determined in the machine coordinate system after each reference point run. The rotary table axis defines the precise position of the rotary table in relation to the reference point (machine zero point) and the tilt with respect to the CMM axes, i.e. the location in the machine coordinate system. All measurement elements, test features and coordinate systems are rotated by calculation about the RT axis when the rotary table is rotated. Thus, errors when calibrating the RT axis have direct effect on the measurement accuracy.

Regularly re-determining the location of the RT axis is also required due to changing surrounding temperatures. In general, the rotary table axis should be recalibrated every time the probe is calibrated. In the case of strong temperature variations, it is often expedient to recalibrate the rotary table axis prior to each workpiece measurement.

Processes for determining the location of a rotary table axis in the machine coordinate system of a CMM are known per se and for example described in WO02090879A2 in various variants. This document relates to a method for determining properties of a coordinate measuring machine by sensing a test object, wherein the coordinate measuring machine comprises a workpiece holder, rotatable about an axis of rotation in relation to a base, for holding the workpiece to be sensed in addition to the base, a probe tip and a sensor system. The test object comprises at least two test bodies, and each test body has such a surface that sensing the surface with the probe tip allows coordinates of at least one reference point of the test body to be determined in the coordinate system of the base, which reference point is securely disposed in relation to the surface of the test body. The at least two test bodies can be securely attached to the workpiece holder in such a way that they have a distance from one another in the direction of the axis of rotation. In the method, the test object is attached to the workpiece holder and the reference points of the test bodies are in each case determined in a plurality of rotational positions. The axis of rotation is determined in the coordinate system of the base—the machine coordinate system—from the determine d reference points.

In conventional methods for determining the location of the RT axis, as described in e.g. WO02090879A2, a body, for example a sphere or a test cylinder, is fastened to the rotary table and sensed, preferably in a plurality of rotary table positions. From this, the RT axis is calculated. However, these methods can generally only be applied when there is no workpiece on the rotary table. Therefore, a disadvantage lies in the fact that a workpiece, the measurement of which has not been completed, must be removed from the rotary table in order to re-determine the location of the RT axis.

There are also methods for calibrating the RT axis directly on the workpiece. However, these methods assume sufficiently flat areas on the workpiece and reprogramming is required for each workpiece.

The so-called RT offset correction is known as a further solution, for example from the Umess-UX software by Carl Zeiss AG. Here, a calibration sphere is fastened to the machine base of the CMM, as closely as possible to the RT axis but next to the rotary table plate. Subsequently, the coordinates of the RT axis and the coordinates of the calibration sphere, or the coordinates of the center point of the calibration sphere, are determined in the machine coordinate system and these coordinates are related to one another, as a result of which the distance between the RT axis and the center point of the calibration sphere is obtained. After a reference point run, the position of the calibration sphere is once again determined using a calibrated probe tip and the location of the RT axis is reestablished using the previously established distance between the calibration sphere and the RT axis. Although this method is quick, it is very inaccurate since the distance between the calibration sphere and the RT axis changes, but is not corrected, in the case of temperature changes.

BRIEF SUMMARY OF THE INVENTION

The object of the present invention consists of finding a solution to one or more of the problems referred to above. In particular, a simplified but sufficiently accurate method for determining the location of the rotary table axis should be specified.

According to a general concept of the invention, a method is specified which, in a simple manner, is suitable for repeated determination of the location of a rotary table axis in the machine coordinate system of a coordinate measuring machine. Use is made of a CMM with two sensing bodies attached thereto, which sensing bodies each have a reference point, referred to as a "sensing body reference point", which can be determined by sensing. With the aid of the sensing body reference points, the location of the rotary table axis can be established by sensing the sensing bodies. A sensing body reference point is situated e.g. on the X-coordinate of the rotary table axis, or in the vicinity of said X-coordinate. A second sensing body reference point is situated e.g. on the Y-coordinate of the rotary table axis, or in the vicinity of said Y-coordinate. The method renders it possible to determine, and, if desired, preferably correct, a temporal drift of the position of the rotary table axis. The advantages of the method will still be specified below.

In particular, a method as claimed is specified. Advantageous embodiments are specified in the dependent claims.

In particular, a method is specified, which is suitable for repeatedly determining the location of a rotary table axis in the machine coordinate system of a coordinate measuring machine, comprising:

a) sensing a test body, situated on the rotary table, in a plurality of rotary table positions using a measuring system of the CMM and determining the X-coordinate and Y-coordinate of the rotary table axis in the machine coordinate system from the sensing points, wherein the method furthermore comprises:

b) sensing a first sensing body, which is attached next to the rotary table and which comprises a first sensing body reference point positioned in a stationary manner relative to the X-coordinate of the rotary table axis, using the measuring system of the CMM and determining the X-coordinate of the first sensing body reference point, c) sensing a second sensing body, which is attached next to the rotary table and which comprises a second sensing body reference point positioned in a stationary manner relative to the Y-coordinate of the rotary table axis, using the measuring system of the CMM and determining the Y-coordinate of the second sensing body reference point, d) repeating steps b) and c) at one or more later times and determining the X-coordinate and the Y-coordinate of the rotary table axis at the later time, or at the later times, from the X-coordinate of the first sensing body reference point and the Y-coordinate of the second sensing body reference point.

Provided that the coordinate measuring machine is not yet provided with both sensing bodies, the method may furthermore comprise:

attaching the first sensing body next to the rotary table, wherein the first sensing body comprises a first sensing body reference point and wherein the first sensing body reference point is positioned in a stationary manner relative to the X-coordinate of the rotary table axis, attaching the second sensing body next to the rotary table, wherein the second sensing body comprises a second sensing body reference point and wherein the second sensing body reference point is positioned in a stationary manner relative to the Y-coordinate of the rotary table axis, The measuring system of the CMM is a tactile measuring system since it is used for sensing. A tactile measuring system is known per se. In particular, the measuring system of the CMM comprises a probe, as is well known in the case of tactile CMMs. The probe may have a probing element, for example a probe sphere or a differently shaped probe element. In particular, sensing is brought about by means of the probe, more particularly by means of a probing element of the probe, as is well known for tactile CMMs.

In the method, listed steps a)-c) may be performed in any sequence. By way of example, steps b) and c) may occur before step a). Preferably, steps a)-c) are performed with short time intervals between them so as to avoid influences, such as e.g. temperature effects, which interfere with the measurement result.

Using the method according to the invention, an accurate and quick method for determining the spatial location of a rotary table axis is provided, which can be used universally for all CMMs with a rotary table. The rotary table axis can be calibrated once, for example on the basis of test bodies which are situated on the rotary table itself, as specified above in step a). Subsequent determinations of the location of the rotary table axis are brought about in a simplified manner on the basis of sensing bodies which are fixed to the CMM next to the rotary table, for example on a workpiece holder or a measuring table of the CMM. The sensing bodies may be positioned so far away from the rotary table that the location of the rotary table axis can subsequently still be determined even if a workpiece is clamped on the rotary table. As a result, determining the location of the rotary table axis is significantly simplified. To this end, a workpiece need not be removed from the rotary table and a renewed determination of the location of the workpiece coordinate system after removing and re-setting of the workpiece on the rotary table is no longer necessary.

By means of the method according to the invention, it is possible to supply standard procedures for determining the location or for calibrating a rotary table axis, wherein in each case it is only necessary to determine a position of a sensing body in the coordinate system of the CMM. No further inputs are required by the user. Since both sensing bodies are disposed in a stationary manner with respect to the rotary table axis in terms of at least one coordinate—X or Y—respectively, no inaccuracies are created when correcting for drift. The drift correction is very accurate since no uncorrected distance, like in the RT offset correction, is present.

The sensing of the two sensing bodies is moreover significantly quicker than the previously known calibration methods for the rotary table axis.

In the method according to the invention, an inaccuracy due to CAA (computer aided accuracy) residual errors is precluded since these residual errors are identical both in the case of the first establishment of the positions of the sensing body reference points and in the subsequently renewed determination of these positions.

In the method according to the invention, constant conditions can be ensured in a simple manner since no changes need to be undertaken on the rotary table and on the CMM in order to determine the X- and Y-coordinates of the rotary table axis at one or more later times. For example, it is not necessary to remove a workpiece from the rotary table for re-measuring the rotary table axis, as explained above. As a result, inaccuracies during the renewed measurement of the rotary table axis, for example due to temperature changes when removing and repositioning a workpiece, can be precluded. Therefore, the method enables the rotary table axis to be determined in a simple manner during the running measurement operation.

Finally, the method can also be retrofitted in existing coordinate measuring machines, or the control software thereof, in a simple manner.

The terms "positioned in a stationary manner relative to the X-coordinate of the rotary table axis" and "positioned in a stationary manner relative to the Y-coordinate of the rotary table axis" mean that the corresponding reference point is stationary, at least in terms of the specified coordinate—X or Y. In the respective non-specified, other coordinate, the reference point may change, as specified in particular embodiments of the invention. The term "stationary" can thus relate only to one coordinate—X or Y. However, the term "stationary" may also relate to a plurality of coordinates—such as X and Y—which is specified in the particular case. Another way of expressing "positioned in a stationary manner relative to the X-coordinate of the rotary table axis" is that the first sensing body reference point, or the position thereof, remains unchanged relative to the X-coordinate of the rotary table axis. This means that the distance between the rotary table axis and the first sensing body reference point is constant, in particular unchanging in time, in the X-direction. Another way of expressing "positioned in a stationary manner relative to the Y-coordinate of the rotary table axis" is that the second sensing body reference point, or the position thereof, remains unchanged relative to the Y-coordinate of the rotary table axis. This means that the distance between the rotary table axis and the second sensing body reference point is constant, in particular unchanging in time, in the Y-direction.

In the following text, individual method steps are described in more detail, in relation to the embodiment with steps a)-d), as specified above.

Step a) of the method—sensing a test body, situated on the rotary table, in a plurality of rotary table positions—can be carried out in a manner known per se. Processes for determining the location of a rotary table axis in the machine coordinate system of a CMM, which may be used in step a) of the method according to the invention, are known per se and described in WO02090879A2 in various variants. Examples include, without loss of generality, the so-called 1-sphere process, the 2-sphere process, the test cylinder process and the self-centering process. These processes are particularly suitable for various cases of application and have specific characteristics. More detailed description on the basis of drawings is provided in the example part.

1-Sphere Process

No additional standards are required in this process. The measurement can be performed using the reference probe. A reference probe is a probe, the form of which is known precisely and in which, preferably, further properties, such as e.g. resilience of a shaft, are known precisely. In particular, the shape of a probe element of the reference probe is well known, for example the exact shape of a probe sphere, which may deviate from an ideal spherical form. All measurements are performed at the same Z-height of the CMM. Perpendicularity residual errors of the CMM may lead to measuring errors in the case of measurements at different Z-heights. Depending on the position of the rotary table in the measuring volume, it may not be possible to cover the whole rotary area. The 1-sphere process is preferred when requirements on the accuracy are not too high. It is preferable for flat workpieces with a large diameter (e.g. crown wheels). The greatest accuracy is obtained if the workpiece is situated at approximately the same measurement height as the sphere was previously, when determining the axis.

2-Sphere Process

The RT axis is calibrated over the whole height of the workpiece. Perpendicularity residual errors of the CMM are thus compensated and have a weaker effect on the measurement uncertainty. The measurement can be performed using a reference probe. Either use is made of a special device, on which both spheres are fastened, or the base system is determined manually during each procedure. Depending on the position of the rotary table in the measuring volume, it may not be possible to cover the whole rotary area. The 2-sphere process is preferably used in the case of high workpieces.

Test Cylinder Process

The RT axis is calibrated over the whole height of the cylinder. Perpendicularity residual errors of the CMM are thus compensated and have a weaker effect on the measurement uncertainty. The measuring time is short and the device is simple: the cylinder can be fastened to the rotary table in a reproducible manner at any time. The test cylinder process can also be used for high workpieces. In particular, the test cylinder process can be used for measuring shafts with a small shape deviation: rather than using a test cylinder, the rotary table axis is then determined directly on the workpiece prior to each measuring procedure.

Self-Centering Process

This is a very quick process. The measurement can be performed using a reference probe. All measurements are performed at the same Z-height of the CMM. Perpendicularity residual errors of the CMM may lead to large measuring errors in the case of measurements at different Z-heights. Depending on the position of the rotary table in the measuring volume, it may not be possible to cover the whole rotary area. In the self-centering process, the element for calibrating the rotary table axis may be fastened directly to the workpiece pallet. Therefore it is possible to recalibrate the rotary table axis before each workpiece measurement without spending much time.

The test body used in step a) of the method may, in particular, be a sphere, as is used e.g. in the 1-sphere process or the 2-sphere process specified above, or a cylinder, as is used in the test cylinder process specified above, or an element, which can be sensed in a self-centering manner by a probe, such as e.g. a cone, a conical depression, a bore or a triple sphere, without being restricted to these.

In the method according to the invention, at least an X-coordinate and a Y-coordinate of the rotary table axis are determined. The rotary table axis may be parallel to the Z-axis of the machine coordinate system. In this case, the X-coordinate and the Y-coordinate of the rotary table axis are unchanging over their entire length. However, the rotary table axis may, instead, be inclined with respect to the Z-axis. In this case, the X-coordinate and the Y-coordinate of the rotary table axis are not constant.

The method according to the invention can then be performed at a specific Z-height of the machine coordinate system. Expressed differently, the X- and Y-coordinates of the rotary table axis and the X- or Y-coordinate of the sensing body can be determined at a constant Z-value—in a measuring plane parallel to the XY-plane. The selected Z-value, or the distance from the measuring plane parallel to the XY-plane, is preferably matched to the shape and attachment height of the sensing bodies. By way of example, if the ring-shaped sensing bodies are selected, a single plane extending through the ring is selected as measuring plane by virtue of the ring being sensed on the inner or outer side. It is also possible to select sensing bodies which can be sensed at different Z-heights, and the X- and/or Y-coordinate thereof (or the coordinates of the reference points of the body) can be determined at different Z-heights. An example for this is a hollow cylinder, which has a greater extent in the Z-direction than a ring. In this variant, it is possible to measure the X- and Y-coordinates of the rotary table axis at different Z-heights in step a) of the method, for example over the whole Z-height of a workpiece, using the 2-sphere process, and to determine the X- and/or Y-coordinate of the reference points of the sensing bodies at in each case the same Z-height.

The first sensing body and the second sensing body are positioned next to the rotary table. That is to say, the sensing bodies do not co-rotate with the rotary table. The sensing bodies are fixed relative to at least the X- or the Y-coordinate of the rotary table axis.

The first sensing body reference point is relatively unchanging in relation to the X-coordinate of the rotary table axis, at least in respect of the X-coordinate of said body. The X-coordinates of rotary table axis and first sensing body reference point are either equal or they have an unchanging spacing (offset) $\Delta X$. The first sensing body may be displaceable in the Y-direction of the machine coordinate system; or it is likewise fixed in the Y-direction. A displacement of the first sensing body in the Y-direction, and hence a displacement of the first sensing body reference point, can be provided since the positioning of the first sensing body can thus be matched to the size or the spatial requirements of a workpiece. Preferably, the first sensing body reference point is also relatively unchanging in relation to the Y-coordinate of the rotary table axis in respect of the Y-coordinate of said body as a result of an appropriate attachment of the first sensing body.

The second sensing body reference point is relatively unchanging in relation to the Y-coordinate of the rotary table axis, at least in respect of the Y-coordinate of said body. The Y-coordinates of rotary table axis and second sensing body reference point are either equal or they have an unchanging spacing (offset) $\Delta Y$. The second sensing body may be displaceable in the X-direction of the machine coordinate system; or it is likewise fixed in the X-direction. A displacement of the second sensing body in the X-direction, and hence a displacement of the second sensing body reference point, can be provided since the positioning of the second sensing body can thus be matched to the size or the spatial requirements of a workpiece. Preferably, the second sensing body reference point is also relatively unchanging in relation to the X-coordinate of the rotary table axis in respect of the X-coordinate of said body as a result of an appropriate attachment of the second sensing body.

As explained above, in the method it is not mandatory for the X-coordinate of the reference point of the first sensing body to be identical to the X-coordinate of the rotary table axis in the machine coordinate system. Nor is it necessary for the Y-coordinate of the reference point of the second sensing body to be identical to the Y-coordinate of the rotary table axis which was established in step a). However, attempts are made to keep a difference between the X-coordinates $\Delta X$ and a difference between the Y-coordinates $\Delta Y$ as small as possible so that errors as a result of changes in $\Delta X$ or $\Delta Y$ are kept as small as possible. By way of example, changes in $\Delta X$ and $\Delta Y$ can be created by thermal expansion. Preferred values of $\Delta X$ and $\Delta Y$ are 0 to 3 mm, preferably 0 to 2 mm and most preferably 0 to 1 mm.

The sensing bodies can preferably be fastened directly or indirectly onto/on the machine base. To the extent that they are used in this description, the terms machine base, measurement table and base plate describe the same object. By way of example, without loss of generality, a base plate may be made out of stone. The type of fastening per se is nonrestrictive; by way of example, it may be interlocking, force-fit or cohesive. By way of example, adhesives or connection elements, such as latching or plug-in connections, may be used as fastening means. If the sensing bodies are disposed displaceably in the X- or Y-direction on the CMM, the fastening can be brought about in a rail aligned in the X- or Y-direction, in which the sensing bodies are displaceable. Then, provision is preferably also made for an apparatus, by means of which the sensing bodies can be locked in the rail in order to avoid unwanted displacement.

By way of example, indirect fastening of the sensing bodies can be brought about by virtue of carriers being fastened to the machine base and each sensing body being fastened to a carrier.

The carriers can be fastened as closely as possible next to the rotary table on the machine base such that they are preferably stationary in the X- and Y-direction. The type of fastening per se is nonrestrictive; by way of example, it may be interlocking, force-fit or cohesive. By way of example, adhesives or connection elements, such as screws, latching or plug-in connections, may be used as fastening means. For fastening using one or more screws, threaded openings which are already provided on the machine base can be used.

The way in which a sensing body is fastened to a carrier is nonrestrictive. By way of example, it may be interlocking, force-fit or cohesive, wherein use can be made of the fastening means listed above.

The carrier may have any form matched to the conditions of the CMM. Without loss of generality, an example is given by a carrier plate. The carrier, for example a carrier plate, may have guide, in particular a linear guide, which is preferably aligned parallel or substantially parallel to the X- or Y-axis of the machine coordinate system when fastening the carrier. When attaching a sensing body, the sensing body can be inserted into the guide and displaced to the desired X- or Y-position. The sensing body can be fastened at the desired position in such a way that it is stationary in the X- and Y-direction on the machine base and on the carrier.

In particular, the invention specifies a method, wherein
 a difference $\Delta X$ between the X-coordinate of the first sensing body reference point and the X-coordinate of the rotary table axis established in step a) is stored in the CMM,
 a difference $\Delta Y$ between the Y-coordinate of the second sensing body reference point and the Y-coordinate of the rotary table axis established in step a) is stored in the CMM, and
 $\Delta X$ and $\Delta Y$ are used for determining the X-coordinate and the Y-coordinate of the rotary table axis in step d).

The values $\Delta X$ and $\Delta Y$ are also referred to as X-offset or Y-offset. In a special case, $\Delta X$ and/or $\Delta Y$ may be zero such that there is no offset. Since the first sensing body is stationary in relation to the X-coordinate of the rotary table axis in respect of the X-coordinate of the first reference point of said sensing body, $\Delta X$ is constant and can be used at a later time for determining the X-coordinate of the rotary table axis. A corresponding statement applies to $\Delta Y$ and the second sensing body reference point. The values $\Delta X$ and $\Delta Y$ can be entered into the measuring computer and processed by specially adapted measuring software.

The type of the first and of the second sensing body is not particularly restricted as long as it is possible to define a reference point which is unchanging in time and relative to the body on or in the sensing body, which reference point can be registered by the measuring system of the CMM in a reproducible manner. In particular, without loss of generality, the sensing bodies are selected from a ring, a disk, a cylinder, a hollow cylinder, a sphere, a gauge block, a female taper and a triple sphere for self-centering sensing, or a combination thereof. An example of a ring is a ring gauge, which has a very small deviation from circularity but may have any diameter. In the case of a ring, a disk, a cylinder, a hollow cylinder or a sphere, it is possible to perform sensing on a plurality of points using the measuring system of the CMM and to determine the center point of the ring, of the disk, of the cylinder or of the sphere. A very good reproducibility of the coordinate of the reference point, for example of the ring or sphere center point, is obtained particularly when sensing by way of scanning. In the case of a rotationally symmetric sensing body, it is preferable for a circular scan to be performed, preferably at a constant Z-height. According to the invention, scanning means the continuous, uninterrupted sensing of a contour with continuous (dynamic) measured value recording, as a result of which a dense point sequence is created. Inaccuracies due to the sensing reproducibility are minimized or precluded by scanning a multiplicity of points.

When using a gauge block of a sensing body, one sensing is sufficient for determining the associated reference point. An advantage is a saving of measuring time.

In one embodiment of the method according to the invention, the sensing in step a), b) and c) is brought about using a reference probe. A reference probe is a probe, the form of which is known precisely and in which, preferably, further properties, such as e.g. resilience of a shaft, are known precisely. In particular, the shape of a probe element of the reference probe is known precisely, for example the exact shape of a probe sphere, which may deviate from an ideal spherical form. As a result, inaccuracies due to inaccurate probe data can be minimized or precluded. A reference probe can also be used in step d); this is preferred. Instead, a measuring probe can be used in step d), which measuring probe is also used during the running measuring operation, and the form of which is generally less well known than that of a reference probe. The use of a measuring probe may be expedient if highest levels of accuracy are not required but shorter measurement times are, and if this can save a probe replacement.

In a further aspect, the invention relates to a coordinate measuring machine, comprising an arrangement of:
- a rotary table,
- a first sensing body, attached next to the rotary table, comprising a first sensing body reference point which is positioned in a stationary manner relative to the X-coordinate of the rotary table axis,
- a second sensing body, attached next to the rotary table, comprising a second sensing body reference point which is positioned in a stationary manner relative to the Y-coordinate of the rotary table axis.

The coordinate measuring machine may, in any combination, have all substantive features which were already described above in the method according to the invention. In particular, the coordinate measuring machine is configured for performing the method described above.

In particular, the coordinate measuring machine comprises a measuring computer and measuring software, which are configured for performing the above-described method according to the invention. In particular, the measuring computer and the measuring software are configured for performing the method as described at the outset.

In particular, the coordinate measuring machine comprises a control device, which is configured for performing the method according to the invention.

By way of example, the coordinates of the sensing body reference points used for the method can be stored in the control device or in the measuring computer, for example in the form of a file such that the control device and/or the measuring computer has this information.

In a special embodiment, it is also possible for a difference ΔX between the X-coordinate of the first sensing body reference point and the previously established X-coordinate of the rotary table axis, and a difference ΔY between the Y-coordinate of the second sensing body reference point and the previously established Y-coordinate of the rotary table axis to be stored in the control device or in the measuring computer such that the control device and/or the measuring computer has this information. In particular, the control device and/or the measuring computer may use stored values ΔX and ΔY for determining the X-coordinate and the Y-coordinate of the rotary table axis.

In a further embodiment, the control device is embodied to control an operation of the coordinate measuring machine in such a way that the coordinate measuring machine senses the first sensing body and the second sensing body, and preferably evaluates sensing information, such as coordinates of sensing body reference points, obtained therefrom.

In general, what applies is that instead of storing information in the CMM, e.g. in a corresponding digital data format in a data storage medium, which the control device of the CMM may access, it is also possible to store said information in a storage medium separate from the CMM, wherein the CMM, for the operation thereof, then preferably has access to the storage medium.

The invention also relates to the use of a coordinate measuring machine, in particular the coordinate measuring machine described above, for performing the method described above.

In a special embodiment of the coordinate measuring machine according to the invention, the first sensing body can be positioned in a variable manner in the Y-direction and/or the second sensing body can be positioned in a variable manner in the X-direction. The advantages of this embodiment were already explained when discussing the method.

Furthermore, the scope of the invention also includes a computer program which performs and/or controls at least steps b), c) and d), and optionally also a), of the above-described method. In particular, the computer program comprises program code means, which may be stored on a computer readable data medium. The computer program may be stored in the CMM or in a storage medium separate from the CMM. By way of example, the computer program may be stored in a data storage medium, to which the control device of the CMM has access, or in a data storage medium which is part of the control device or in a data storage medium which is part of the measuring computer.

Furthermore, the scope of the invention also includes a data medium, on which a data structure is stored which, after being loaded into a main and/or central memory of a computer or computer network, performs at least steps b), c) and d), and optionally also a), of the above-described method.

The invention will be described below on the basis of special exemplary embodiments. In detail:

DESCRIPTION OF THE INVENTION

Figure 1:
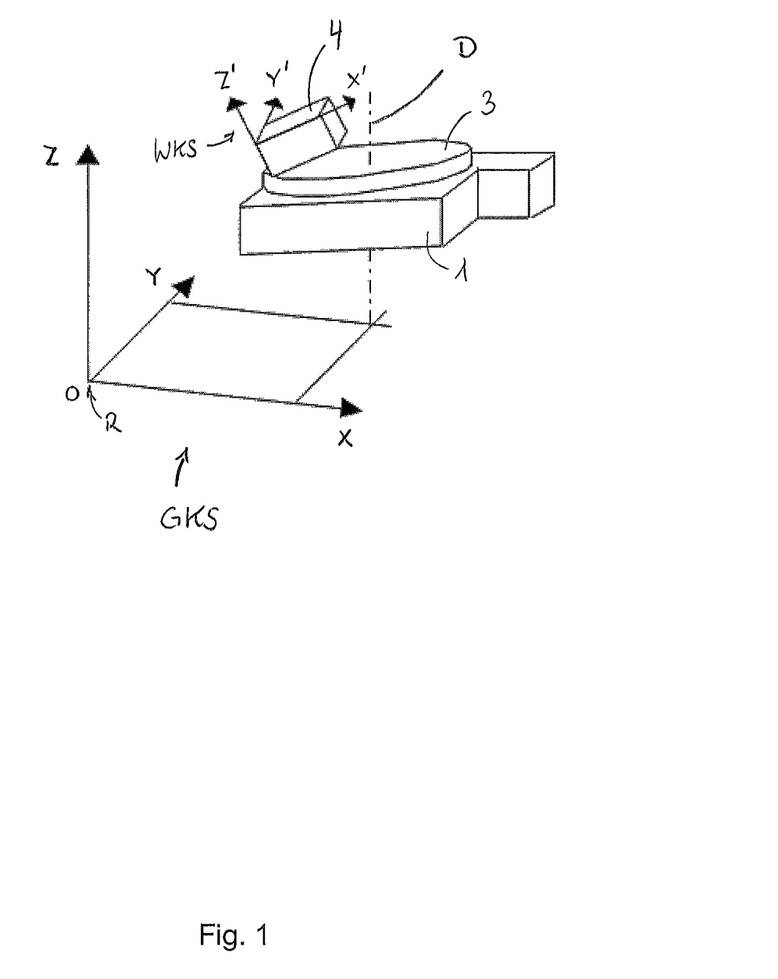
FIG. 1 shows the location of a rotary table axis and of a workpiece in a machine coordinate system.

FIG. 1 shows a machine coordinate system MCS with the axes X, Y and Z and the origin or reference point R at the zero point of the machine coordinate system. The axes of the machine coordinate system MCS are also referred to as CMM axes. A rotary table 2, which is rotatable about the rotary table axis D relative to the plate 1, is placed onto a measuring table 1 made of hard rock. The rotary table axis defines the precise position of the rotary table in relation to the machine zero point (reference point) R and the tilt in relation to the axes of the machine coordinate system MCS, i.e. the location in the MCS. The rotary table 3 carries the workpiece 4 with the associated workpiece coordinate system WCS, which is defined by the coordinate axes X', Y' and Z'. The sensing points which are established in the method according to the invention relate to the machine coordinate system MCS, which is parallel to the displacement axes of the CMM.

All measurement elements, test features and coordinate systems are rotated by calculation about the rotary table axis D when the rotary table is rotated. Errors when calibrating the rotary table axis D have direct effect on the measurement accuracy. In the following FIGS. 2 and 3, processes, which can find use in an exemplary manner in step a) of the method according to the invention, for calibrating the rotary table axis D are presented.

Figure 2:
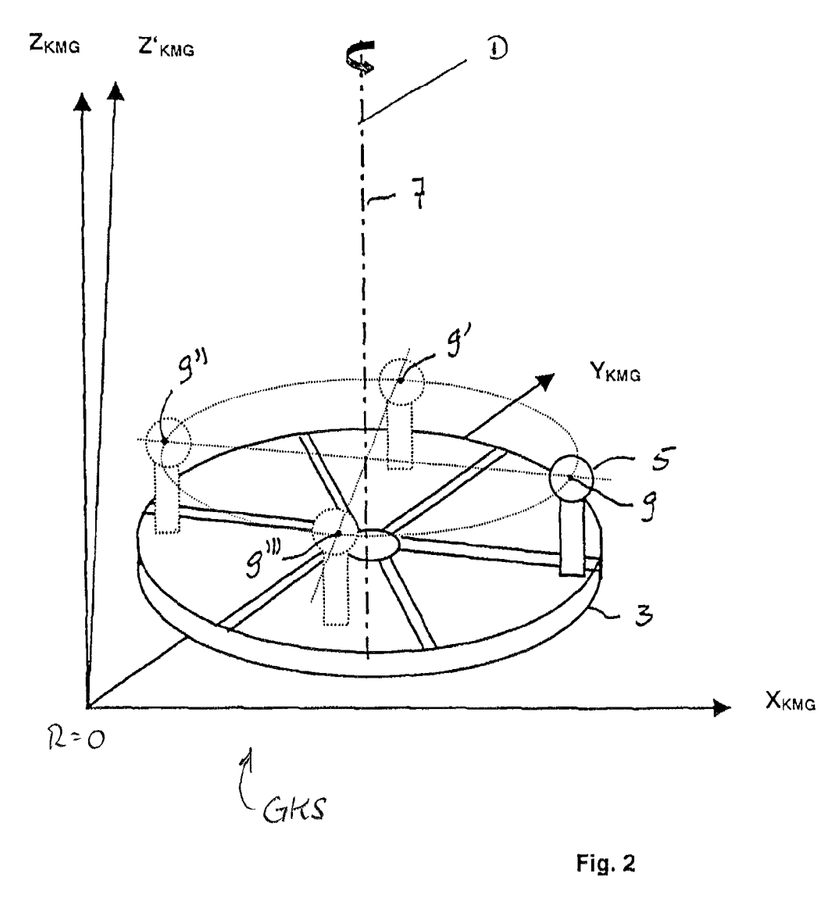
FIG. 2 shows the calibration of a rotary table axis using the 1-sphere process.

The 1-sphere process for calibrating the rotary table axis D is described in FIG. 2. The axes of the machine coordinate system MCS are denoted by $X_{CMM}$, $Y_{CMM}$, and $Z_{CMM}$. In order to determine the axis of rotation of a workpiece holder rotatable in relation to the base, i.e. in the case of a coordinate measuring machine with a so-called rotary table, the standard VDI/VDE 2617 sheet 4 provides a method in the so-called "3D-α Test" for calibrating the axis of rotation in the coordinate system of the base. On a rotary table 3, a sphere 5 is securely affixed closely over the rotary table surface outside of an axis of rotation 7 of the rotary table. The surface of the sphere is sampled with the probe tip of the coordinate measuring machine in order thereby to determine the center point 9 of the sphere. Determining the sphere center point is repeated at at least three different rotational positions of the rotary table in respect of the axis of rotation. Using the sphere center points 9, 9', 9", 9'" obtained thus, a plane and a circle center point are determined. The perpendicular on the plane at the sphere center point then is the axis of rotation of the rotary table in the coordinate system ($X_{CMM}$, $Y_{CMM}$, $Z_{CMM}$) of the coordinate measuring machine. Even if a displacement axis $Z'_{CMM}$ of the coordinate measuring machine oriented to the directions $X_{CMM}$ and $Y_{CMM}$ is not precisely orthogonal to the directions $X_{CMM}$ and $Y_{CMM}$—that is to say if a so-called deviation from perpendicularity or perpendicularity error is present—this method results in the correct orientation of the rotary table axis in the orthogonal coordinate system of the coordinate measuring machine, i.e. the calibrated rotary table axis corresponds to the mechanical axes of rotation of the rotary table.

Figure 3:
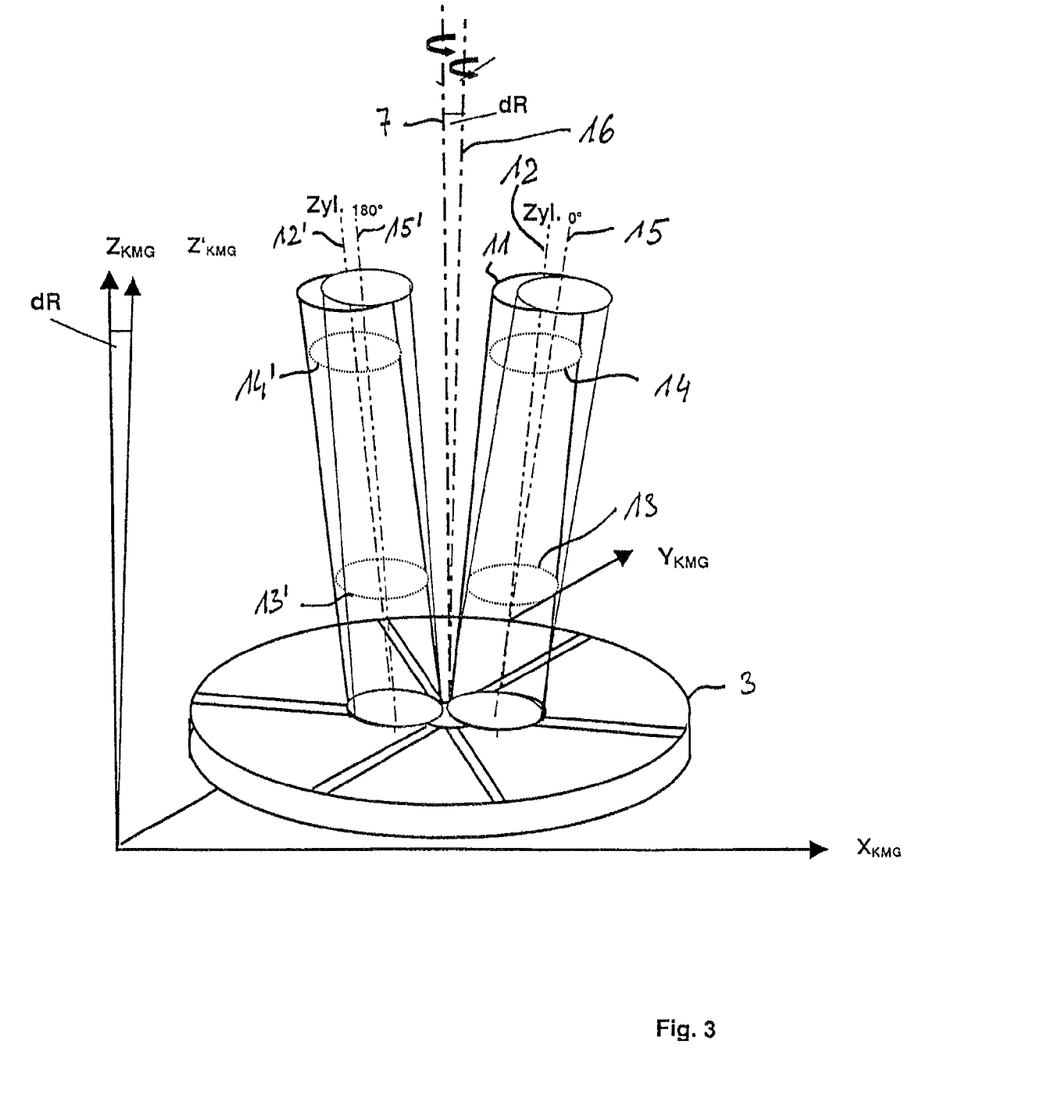
FIG. 3 shows the calibration of a rotary table axis using the test cylinder process.

However, if subsequently e.g. workpieces which extend away from the rotary table surface in the z-direction are measured, measuring errors emerge with increasing distance from the plane determined from the sphere center points 9, 9', 9", 9'" due to a deviation from perpendicularity between the directions $Z'_{CMM}$ and $Y_{CMM}$ or $X_{CMM}$. In such a case, the rotary table axis is determined using the method explained below on the basis of FIG. 3:

A cylindrical test body 11 is securely attached to the rotary table 3 with the mechanical axis of rotation 7, wherein the cylinder axis of said cylindrical test body is denoted by 12. A circumference 13 of the cylinder is sampled in a plane in the vicinity of the rotary table surface and a further circumference 14 of the cylinder is sampled in a plane further away from the rotary table surface. The cylinder axis is established using the two circumferences or cross-sections 13, 14. However, since the displacement axis $Z'_{CMM}$ of the coordinate measuring machine deviates from the direction $Z_{CMM}$ orthogonal to the directions $X_{CMM}$ and $Y_{CMM}$ by an angle dR, the calculated cylinder axis 15 does not coincide with the mechanical cylinder axis 12 thereof. The rotary table is now rotated by 180° and a lower cross section 13' and an upper cross section 14' are measured in the new rotational position. A cylinder axis 15' established in this rotational position emerges therefrom. Thereupon, a rotary table axis 16, which forms the axis of symmetry to the cylinder axes 15 and 15' established in the two rotational positions, is calculated. The rotary table axis 16 calculated thus likewise deviates from the mechanical axis of rotation 7 of the rotary table by the angle dR. However measuring errors, which are generated due to the deviation from perpendicularity dR, are suppressed when sensing cylindrical workpieces extending in the z-direction in the case of the rotary table axis established thus. This method places high demands on the precision of the cylindrical test body 11. Determining the cylinder axis 15 is limited by the precision with which the cross sections 13, 14 are measured. In this method, this precision can be limited by a deviation from perpendicularity between the axes $X_{CMM}$ and $Y_{CMM}$ and length measuring deviations in the directions $X_{CMM}$ and $Y_{CMM}$.

A further process for determining the location of a rotary axis in a machine coordinate system is presented in WO02090879A2. Use is made of a test object comprising at least two test bodies which have such a surface that, by sensing the surface with the probe tip, coordinates of at least one reference point of the test body, which is fixedly or reproducibly disposed in relation to the surface of the test body, can be determined in the coordinate system of the base (i.e. the machine coordinate system). A precisely manufactured sphere or a cube is a possible test body. In the case of a sphere, the process in WO02090879A2 presents a 2-sphere process, which is specified in the general part of the description. It is also possible to use a self-centering sensing body, such as a triple sphere or a cone. By way of example, if a sphere is used as a test body, the sphere center point can then be uniquely determined in the coordinate system of the base by sensing the sphere surface. The two test bodies are attached to the workpiece holder and to the rotary table in such a way that they are spaced apart in the direction of the axis of rotation. A more detailed description of the process is specified in WO02090879A2, page 5 to page 10, inclusive, and in the patent claims of WO02090879A2. The process is described in FIGS. 4-10 in WO02090879A2 and in the associated description of the figures on page 12 up to page 25 inclusive. In order to explain the present invention, reference is explicitly made to the aforementioned disclosure of WO02090879A2.

Figure 4:
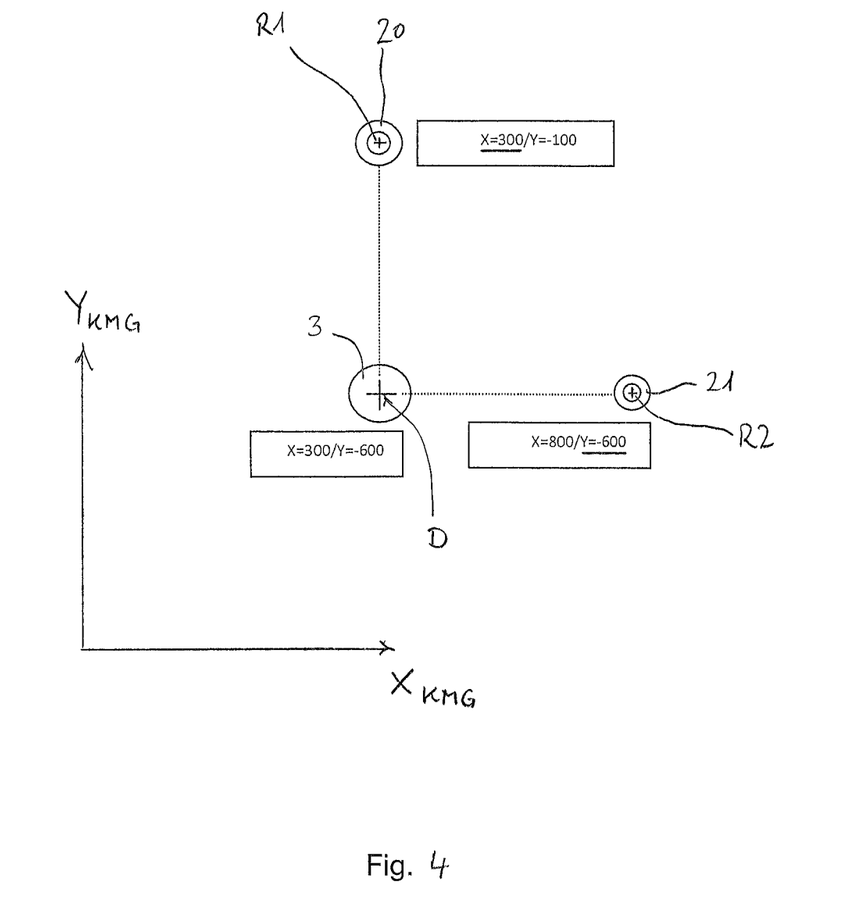
FIG. 4 shows the positioning of two sensing elements relative to the rotary table axis.

The further steps of the method according to the invention are explained on the basis of FIG. 4. The view of the observer falls in the Z-direction on the XY-plane of the machine coordinate system such that the Z-axis of the machine coordinate system is perpendicular to the plane of the drawing. By way of example, the view of the observer falls onto a measuring table of the CMM, on which a rotary table 3 is positioned. A first sensing body 20 and a second sensing body 21 are attached next to the rotary table 3 with the rotary table axis D. In this special case, the sensing bodies 20, 21 are ring gauges. The size of the rotary table 3 and the size of the ring gauges 20, 21 are not drawn to scale. In the real case, the rotary table 3 would be larger in comparison with the ring gauges 20, 21. Furthermore, the location of the rotary table 3 and the sensing bodies 20, 21 is not to scale in the plotted machine coordinate system. By way of example, the sensing bodies 20, 21 may be fastened onto the measuring table of the CMM. The first ring gauge 20 comprises the ring center point R1 as first sensing body reference point. The second ring gauge 21 comprises the ring center point R2 as second sensing body reference point. In the present example, the CMM has a measuring range of X=850 and Y=1000. The rotary table axis D is positioned at the coordinates X=300 and Y=−600. The reference point R1 of the ring gauge 20 is positioned at X=300 and Y=−100.

That is to say, the X-coordinate of R1 is identical to the X-coordinate of D. However, the two X-coordinates may also have a deviation (offset) ΔX. What is decisive is that the X-coordinate of R1 remains unchanged relative to the X-coordinate of D. The Y-coordinate of R1, situated at Y=−100, may be modifiable, for example by virtue of a displaceability of the ring gauge 20 in the direction of the $Y_{CMM}$-axis. The reference point R2 of the ring gauge 21 is positioned at the coordinates X=800/Y=−600, i.e. R2 and the rotary table axis D have the Y-coordinate in common. The Y-coordinates need not be identical, but they cannot be changed relative to one another. The X-coordinate of R2 may be modifiable, for example by virtue of a displaceability of the ring gauge 21 in the direction of the $X_{CMM}$-axis. By means of a positioning device, for example a template, the ring gauges 20, 21 can be attached next to the rotary table 3 in such a way that the X-coordinate of R1 in the ring gauge 20 and the Y-coordinate of R2 in the ring gauge 21 correspond approximately or exactly to the corresponding coordinates of the rotary table axis D, depending on the accuracy of the positioning device. The precise locating of the coordinates of R1 and R2 is subsequently carried out by sensing the ring gauges 20, 21 on the outer side or on the inner side—depending on the type of ring gauge—using the measuring system of the CMM, more precisely using a probe, preferably in a scanning mode. The location of the rotary table axis D in the machine coordinate system is determined once by the measuring system of the CMM according to a known method, for example a method as explained above on the basis of FIG. 2 or 3. Following this, the relative positions of D, R1 and R2 are known. The coordinates of D, R1 and R2 can be entered automatically or manually into the measuring computer or the measuring software. For the subsequent determination of the location of the rotary table axis D in the machine coordinate system, all that needs to be done is to sense the ring gauges 20 and 21 and re-determine the coordinates of R1 and R2. From this, the location of the rotary table axis D in the machine coordinate system can easily be calculated at every subsequent time. As stated previously, the view of the observer for example falls onto a measuring table or a base of the CMM from above. The X and Y axes are only depicted schematically. The Z-axis extends in the direction of view.

Further structural parts of a CMM known per se are not depicted in any more detail in FIG. 4. By way of example, the CMM can be a bridge-type CMM, as is described in terms of structural details in US20110000277 and depicted in an exemplary manner in FIG. 1 of said document. A control device and a measuring computer, which are part of a CMM and integrated into the CMM in the known manner are not depicted either.

Figure 5:
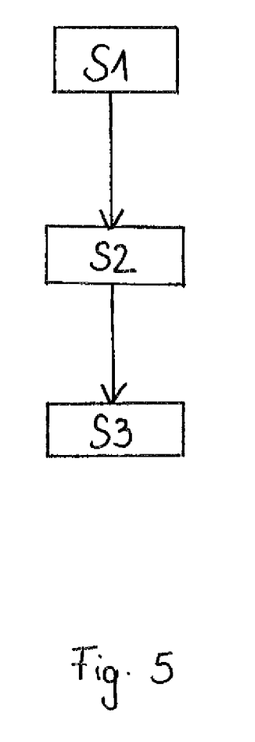
FIG. 5 shows a procedure of the method according to the invention.

FIG. 5 depicts a procedure of the method according to the invention in terms of the individual steps thereof. In step S1, there is the sensing of a test body 9, situated on the rotary table 3, in a plurality of rotary table positions using the measuring system of the CMM and determining the X-coordinate and the Y-coordinate of the rotary table axis D in the machine coordinate system ($X_{CMM}$, $Y_{CMM}$, $Z_{CMM}$, $Z'_{CMM}$) from the sensing points. This step was already explained above on the basis of FIG. 2 using the example of the 1-sphere process. By way of example, sensing may take place with a probe element known per se, for example a probe sphere.

The further steps S2 and S3 take place using sensing bodies 20 and 21, which were already explained in FIG. 4. In step S2 there is sensing of the first sensing body 20, which is attached next to the rotary table 3 and which comprises the first sensing body reference point R1 positioned in a stationary manner relative to the X-coordinate of the rotary table axis D, using the measuring system of the CMM and determining the X-coordinate of the first sensing body reference point R1. By way of example, sensing can take place using a probe element known per se. In step S2 there is a sensing of the second sensing body 21, which is attached next to the rotary table 3 and which comprises the second sensing body reference point R2 positioned in a stationary manner relative to the Y-coordinate of the rotary table axis D, using the measuring system of the CMM and determining the Y-coordinate of the second sensing body reference point R2. In principle, the temporal sequence of the steps S1, S2 and S3 is arbitrary, with step S1 only having to be performed once. Steps S2 and S3 can be repeated as desired at subsequent times.

The invention claimed is:

1. A method for determining a position of a rotary table axis in a machine coordinate system of a coordinate measuring machine, the method comprising:
   a) sensing a test body, situated on the rotary table, in a plurality of rotary table positions using a measuring system of the coordinate measuring machine at a plurality of sensing points on the test body, and determining an X-coordinate and a Y-coordinate of the rotary table axis in the machine coordinate system from the sensing points;
   b) sensing a first sensing body, which is disposed next to the rotary table and which includes a first sensing body reference point stationarily positioned relative to the X-coordinate of the rotary table axis, using the measuring system of the coordinate measuring machine and determining the X-coordinate of the first sensing body reference point;
   c) sensing a second sensing body, which is disposed next to the rotary table and which includes a second sensing body reference point stationarily positioned relative to the Y-coordinate of the rotary table axis, using the measuring system of the coordinate measuring machine and determining the Y-coordinate of the second sensing body reference point;
   d) repeating step b) and step c) at one or more later times and determining the X-coordinate and the Y-coordinate of the rotary table axis at the one or more later times, from the X-coordinate of the first sensing body reference point and the Y-coordinate of the second sensing body reference point.

2. The method according to claim 1, wherein the first sensing body reference point is positioned on the X-coordinate, or in a vicinity of the X-coordinate, of the rotary table axis.

3. The method according to claim 1, wherein the second sensing body reference point is positioned on the Y-coordinate, or in a vicinity of the Y-coordinate, of the rotary table axis.

4. The method according to claim 1, which comprises:
   storing a difference ΔX between the X-coordinate of the first sensing body reference point and the X-coordinate of the rotary table axis established in step a) in the coordinate measuring machine;
   storing a difference ΔY between the Y-coordinate of the second sensing body reference point and the Y-coordinate of the rotary table axis established in step a) in the coordinate measuring machine; and
   using the differences ΔX and ΔY for determining the X-coordinate and the Y-coordinate of the rotary table axis in step d).

5. The method according to claim 1, wherein the first and second sensing bodies are selected from the group consisting of a ring, a disk, a cylinder, a hollow cylinder, a sphere, a gauge block, a female taper, a triple sphere, and combinations thereof.

6. The method according to claim 1, wherein the steps of sensing the first sensing body and the second sensing body comprise scanning the respective sensing body.

7. The method according to claim 1, wherein steps a)-c) comprise sensing the test body and the first and second sensing bodies with a reference probe.

8. The method according to claim 7, wherein step d) comprises sensing the first and second sensing bodies with the reference probe.

9. A coordinate measuring machine, comprising:
   a rotary table having a rotary table axis;
   a first sensing body, attached next to said rotary table and having a first sensing body reference point positioned in a stationary relationship relative to an X-coordinate of the rotary table axis;
   a second sensing body, attached next to said rotary table and having a second sensing body reference point positioned in a stationary relationship relative to a Y-coordinate of the rotary table axis.

10. The coordinate measuring machine according to claim 9, wherein said first sensing body reference point is positioned on the X-coordinate of said rotary table axis.

11. The coordinate measuring machine according to claim 9, wherein said first sensing body reference point is positioned in a vicinity of the X-coordinate of said rotary table axis.

12. The coordinate measuring machine according to claim 9, wherein said second sensing body reference point is positioned on the Y-coordinate of said rotary table axis.

13. The coordinate measuring machine according to claim 9, wherein said second sensing body reference point is positioned in a vicinity of the Y-coordinate of said rotary table axis.

14. The coordinate measuring machine according to claim 9, wherein said first sensing body is variably positionable in a Y-direction and said second sensing body is variably positionable in the X-direction.

15. The coordinate measuring machine according to claim 9, configured for performing the following method steps:
   a) sensing a test body, situated on said rotary table, in a plurality of rotary table positions using a measuring system of the coordinate measuring machine at a plurality of sensing points on the test body, and determining an X-coordinate and a Y-coordinate of the rotary table axis in the machine coordinate system from the sensing points;
   b) sensing said first sensing body at said first sensing body reference point with the measuring system of the coordinate measuring machine and determining the X-coordinate of the first sensing body reference point;
   c) sensing said second sensing body at said second sensing body reference point with the measuring system of the coordinate measuring machine and determining the Y-coordinate of the second sensing body reference point; and
   d) repeating step b) and step c) at one or more later times and determining the X-coordinate and the Y-coordinate of the rotary table axis at the one or more later times, from the X-coordinate of said first sensing body reference point and the Y-coordinate of said second sensing body reference point.

* * * * *